United States Patent Office 3,012,434
Patented Dec. 12, 1961

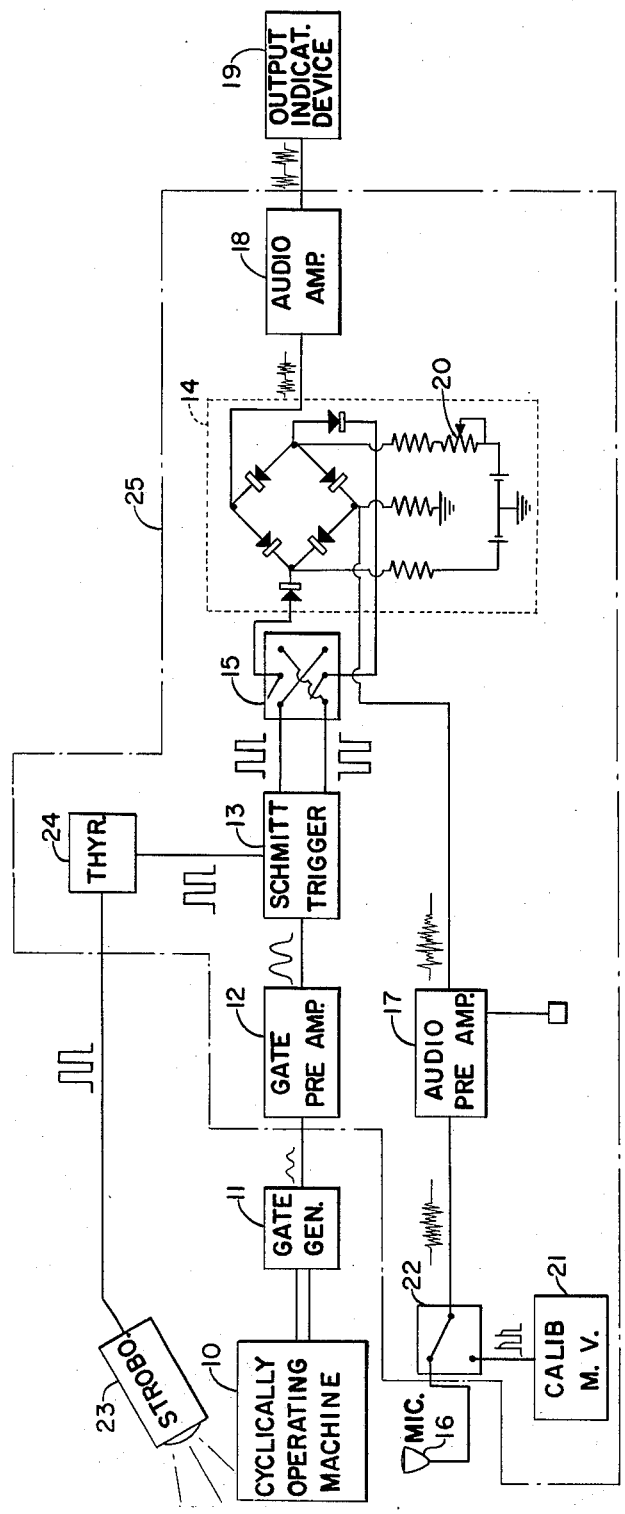

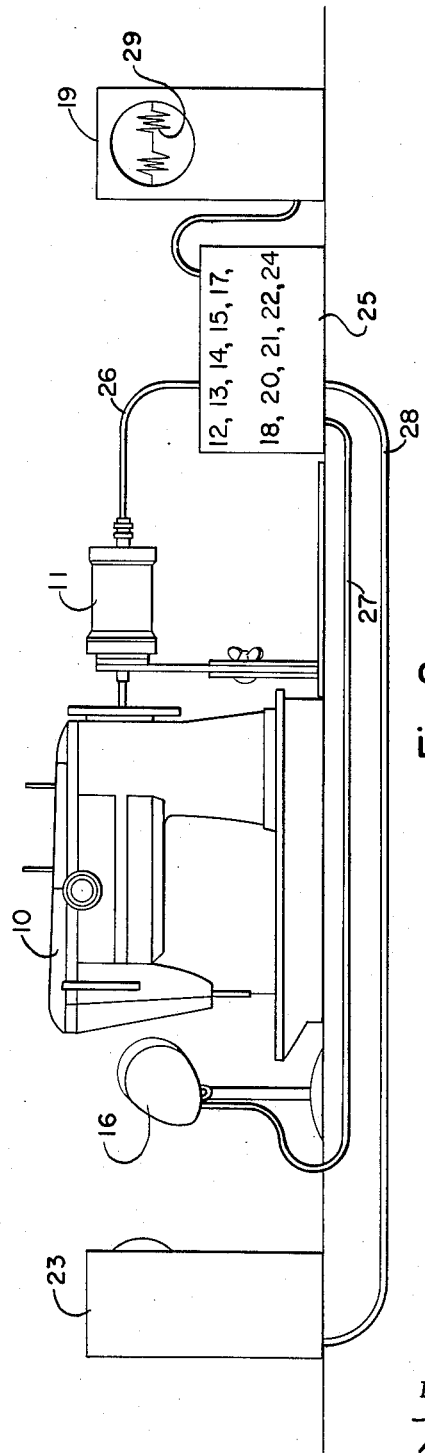

3,012,434
SYSTEM FOR EXAMINING AND LOCATING NOISE IN CYCLICALLY OPERATING MACHINES
Hubert Wehof, North Plainfield, N.J., assignor to The Singer Manufacturing Company, Elizabeth, N.J., a corporation of New Jersey
Filed Apr. 28, 1959, Ser. No. 809,538
3 Claims. (Cl. 73—71.4)

This invention relates in general to systems for examining and locating noise in cyclically operating machines. More particularly, it relates to a system whereby the noise created by a cyclically operating machine may be examined during periodic selected time portions of each operating cycle to determine the position of the maximum noise output in the cycle.

In cyclically operating machines such as sewing machines, where, during each rotation of the arm shaft, variable loading occurs due to crank drives, reciprocating masses and changing cam loading, it is important to search for and examine the noise peaks created during small selected time portions of the rotation so that the specific mechanism causing the noise peaks can be isolated and corrected. The total continuous noise output from the machine, of course, gives no clue as to which of the machine elements contributes the most to it.

According to the present invention, a microphone is used as a noise pick-up device and is effectively connected to an output device through an electronic transmission gate which is periodically opened for selected time portions of each operating cycle so that the noise generated only during said time portions may be observed. By selecting progressively different time portions for examination, the entire rotational cycle of the machine may be scanned to locate the noise peaks.

Heretofore, great difficulty has been experienced in getting a true noise signal because the gating frequency, being in the audible range, was superimposed on and masked the noise signal desired to be heard. Thus the act of measuring the noise produced additional noise not present in the machine under test, and, therefore, the test did not represent true conditions.

This difficulty has been completely eliminated according to the present invention by incorporating in the system a diode gating circuit which may be balanced to eliminate the gating pulse from the output noise signal passed by the gating pulse.

It is, therefore, an object of this invention to provide a system for examining and measuring the noise output created by a cyclically operating machine during selected portions of an operating cycle without producing any additional output noise due to the system itself.

A further object of the invention is to provide, in the above system, means for establishing a reference noise level so that all output indications may be referenced to a common base.

Objects and advantages other than those above will be apparent from the following description when read in connection with the accompanying drawings, in which:

FIG. 1 diagrammatically illustrates one embodiment of the present invention; and FIG. 2 is a pictorial representation of a typical test set-up.

Referring to FIG. 1, 10 indicates a cyclically operating machine under test driving a gating signal generator 11 which may preferably be of the photoelectric type shown and described in the United States patent application Serial No. 809,537, filed April 28, 1959. It is sufficient for the purposes of this invention to observe that the generator 11 produces one output voltage pulse for each cycle of operation of the machine 10. In a sewing machine, for example, the generator 11 is driven directly from the arm-shaft and provides one output pulse for each complete revolution of the arm-shaft. Further, the output pulse is adjustable as to width and phase position by manual means as set forth in the aforesaid patent application.

The train of pulses from generator 11 is passed on to the gate preamplifier 12 to increase the amplitude and is then presented to a Schmitt trigger 13, which is essentially a pulse squaring circuit and is shown and described on page 165 of the book "Pulse and Digital Circuits" by Millman and Taub, McGraw-Hill Book Company, New York, N.Y., 1956. The output of the Schmitt trigger comprises two sharp pulse trains identical except for being symmetrical mirror images of each other.

These two pulse trains form the control voltages for a diode transmission gate 14. A mode reversing switch 15 permits these pulse trains to be interchanged with respect to the transmission gate 14. This allows the open and closed condition of the gate to be reversed selectively, which means that a signal input to the gate may be passed for the selected time portion of the cycle to be examined or for the remainder of the cycle, whichever is desired. This is obviously a great convenience for direct comparison purposes.

The noise signal input to the diode gate 14 is derived from a microphone 16 placed to pick up noise from the machine 10. After amplification by an audio preamplifier 17 with manual gain control, this signal is impressed on the diode gate 14 which passes it on to the amplifier 18 for a time portion in each cycle determined by the gating pulses from the generator 11 as modified by the Schmitt trigger 13. An output indicating device 19 is connected to the amplifier 18 and may be an oscilloscope or VU meter for visual indication, or a loudspeaker or earphones for aural indication.

The diode transmission gate 14 is of the type shown and described on page 445 of the book "Pulse and Digital Circuits," Millman and Taub, McGraw-Hill Book Company, New York, N.Y., 1956, and contains a balancing resistance control 20 which may be adjusted to vary the relative biasing voltage and thus remove the control pulses and their effect from the output signal. In this manner only the noice picked up by the microphone 16 reaches the output indicating device 19 and thus gives a true picture of the actual operating conditions.

In order to establish a reference noise level as a basis for comparing noise values found in the same or different machines, a free-running, stable multivibrator 21 is, by means of a switch 22, temporarily substituted for the microphone 16. The gain control of the preamplifier 17 is then manually set to bring the indicating device to some arbitrary index which may be called zero level. The microphone is then restored to the circuit and the noise level of the machine 10 may be read directly on the indicating device 19. In this manner, standard instruments calibrated in the same way may be expected to give closely analogous results and it becomes feasible to compare directly the results obtained from different instruments so calibrated.

The microphone 16 should be physically small so that it will have a minimum disturbing effect on the sound field in which it is immersed. It should also have a flat response over a considerable frequency range so that the test result will not be unduly influenced by its own characteristics.

It is clear that the position and width of the pulses generated by the gating generator 11 determine the portion of the cycle in which the noise is observed and, by progressively adjusting the phase position of the gating pulses, the entire rotational cycle of the machine may be scanned to locate the noise peaks. Once a noise peak is located in the cycle, the machine 10 may be placed statically in that position to observe the relation of the parts and, from this observation may be deduced the probable cause of the peak.

There is also provided a conventional stroboscopic illuminating device 23 driven from a thyratron 24 triggered by one of the output pulse trains from the Schmitt trigger. In this manner, the rotating machine 10 may be visually examined, while running, to determine the dynamic relation of the parts corresponding in time to the occurrence of the noise peaks. The offending mechanical element may thus be tracked down and eliminated or improved upon as a noise source.

The wave forms shown at various points in the circuit of FIG. 1 represent the time variation of the instantaneous voltage at those points.

The amplifiers and preamplifiers of the system of this invention are conventional transistor, multi-stage common-emitter, RC coupled amplifiers with built-in bias supplies for compactness and portability.

A typical test set-up for a sewing machine is shown in FIG. 2 wherein the major circuitry is contained, as indicated, within a single portable case 25.

The gating generator 11 is connected mechanically to the arm shaft of the sewing machine 10 and carries an output cable 26 for plugging into case 25. A microphone 16 and a Strobotac 23 are connected to case 25 by respective cables 27 and 28. The output indicating device 29 with display 29 is here shown as an oscilloscope and is connected to case 25 by cable 30. As the generator 11 is adjusted to progressively sweep the gating pulse over the operating cycle, the display 29 is observed for noise peaks. When a noise peak is located the dynamic relation of the mechanism may then be frozen and studied visually by the illumination from the Strobotac 23.

Although but one embodiment of the present invention has been illustrated and described, it will be apparent to those skilled in the art that various changes and modifications may be made therein without departing from the spirit of the invention or from the scope of the appended claims.

The present invention has been illustrated as applied to the determination of noise peaks. It is clear that, by using other suitable transducers in place of the microphone 16, any varying physical quantity such as pressure, strain, temperature and velocity, may be studied over selected portions of an operating cycle. In fact, any physical quantity which can be transformed into a proportional voltage variation can be studied by the system of this invention.

Having thus set forth the nature of the invention, what I claim herein is:

1. A system for examining the noise created by a cyclically operating machine during selected time portions of an operating cycle of said machine, comprising a generator driven synchronously with the machine for supplying gating pulses, a microphone, an amplifier, a circuit for said microphone, a Schmitt trigger circuit for squaring the gating pulses and supplying two symmetrical pulse trains of opposite polarity, an electronic transmission gate employing a diode bridge circuit having as control voltages the two pulse trains and including two fixed D.C. biasing voltages for rendering the microphone circuit effective periodically to transmit noise signals to said amplifier for a time determined by said pulse trains, indicating means connected to said amplifier, balancing means for adjusting the relative value of the two fixed biasing voltages for removing the gating pulses from the output noise signals, and manual means for varying the position and duration of the gating pulse generated in each cycle by said generator in order to scan the machine cycle to determine the position of the maximum output noise signal for the machine.

2. A system according to claim 1 including means for deriving output pulses synchronous with the gating pulses for driving a stroboscopic illuminating device to facilitate the visual examination of the running machine during said selected time portions for possible sources of said maximum noise.

3. A system according to claim 1 including selective means for substituting for the microphone a calibrated signal generator to establish a reference noise level for calibrating said indicating means.

References Cited in the file of this patent

UNITED STATES PATENTS

| | | |
|---|---|---|
| 1,907,415 | Carpenter et al. | May 2, 1933 |
| 2,174,176 | Journeaux et al. | Sept. 26, 1939 |
| 2,879,665 | Adams | Mar. 31, 1959 |